Patented Feb. 2, 1926.

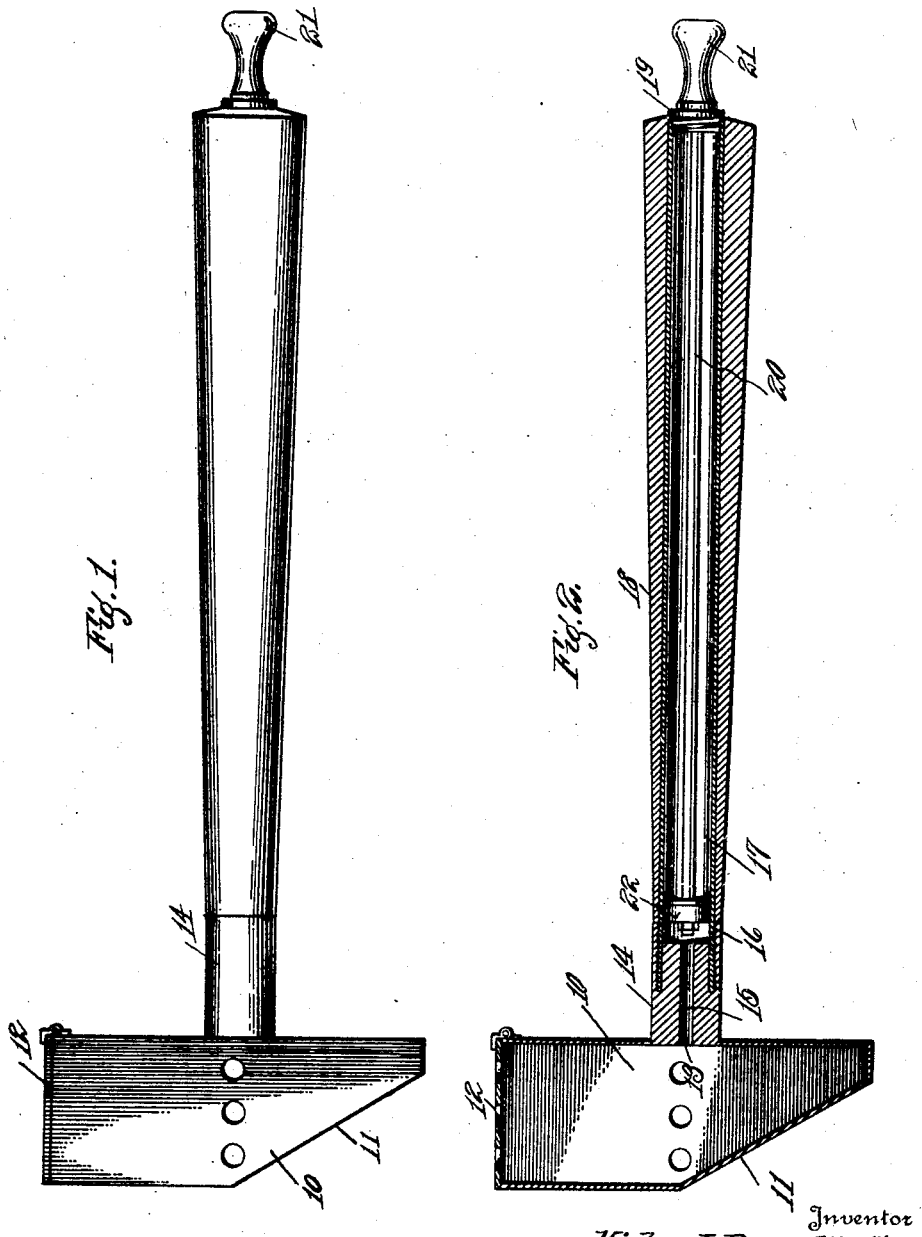

1,571,903

UNITED STATES PATENT OFFICE.

VICTOR J. ROSENBLATT, OF ALEXANDRIA, EGYPT.

SOLDERING IRON.

Application filed October 17, 1923. Serial No. 669,143.

*To all whom it may concern:*

Be it known that I, VICTOR J. ROSENBLATT, a citizen of Egypt, residing at Alexandria, Egypt, have invented certain new and useful Improvements in Soldering Irons; and I do hereby declare the following to be a full, clear, and exact description of the invention, such as will enable others skilled in the art to which it appertains to make and use the same.

This invention relates to new and useful improvements in soldering devices and particularly to soldering irons.

One object of the invention is to provide a new and improved form of self-heating soldering irons.

Another object is to provide a soldering iron which is heated by means of coal, and wherein a draft of air may be forced to aid the combustion.

Other objects and advantages will be apparent from the following description when taken in connection with the accompanying drawing.

In the drawing:

Figure 1 is a side elevation of a soldering iron made in accordance with the invention.

Figure 2 is a vertical longitudinal central sectional view through the device.

Referring particularly to the accompanying drawing, 10 represents the head of the soldering iron, which is in the form of a box, with one end beveled, as shown at 11, said beveled end serving as the operating end of the head. On the other end of the head there is hinged a perforated cover or lid 12, said openings forming the exit for the products of combustion which are produced within the head. In one side of the head there is formed an opening 13, and secured within this opening is one end of a metal tube 14, the same having a bore 15 of small diameter, adjacent the head and communicating therewith, and the larger bore 16, which communicates with the smaller bore. Engaged within the outer end of the larger bore 16 is one end of the longer tube 17, which has the wooden casing 18 surrounding it, and which forms the grip of the handle. Screwed into the outer end of the tube 17 is a centrally apertured cap nut 19, through which slides the plunger rod 20, said rod being provided with a hand grip 21, on its outer end, externally of the handle. On the inner end of the rod 20, and movable longitudinally within the larger bore 16, is the plunger 22, which is adapted to force air into the head, to increase the combustion of the fuel therein, and effectively heat the head.

The head is adapted to be filled with coal, on which has been poured a small quantity of oil. The oil is then ignited, and the cover closed. Upon drawing the plunger 22 outwardly, a current of air will be drawn from the atmosphere around the head, through the openings of the head, and across the fuel therein and then upon pushing the plunger inwardly, a column of air, under pressure, will be forced into the head, and out through said openings with the result that the combustion of the coal will be increased, and the head properly heated. This will maintain the head in a heated condition for a comparatively long period, thus permitting the workman to perform the act of soldering for a greater length of time than with the ordinary soldering iron, where the iron must be repeatedly heated. In the ordinary method employed, the workman must provide himself with several irons, having one in use while the others are in a small furnace, being heated.

What is claimed is:

A soldering iron comprising a hollow head having openings in opposite sides and in one end, a hollow handle secured to one of the unapertured sides of the head and communicating therewith, and a piston in the handle arranged to be reciprocated to draw air through the head and into the handle, when moved in one direction, and to force said air out of said head upon movement in the opposite direction.

In testimony whereof, I affix my signature.

VICTOR J. ROSENBLATT.